UNITED STATES PATENT OFFICE.

WILLIAM L. SIMMONS, OF WEATHERFORD, TEXAS.

IMPROVEMENT IN MEDICAL COMPOUNDS OR LIVER INVIGORATORS.

Specification forming part of Letters Patent No. 122,672, dated January 9, 1872.

Specification describing an Improvement in Medical Compound invented by WILLIAM L. SIMMONS, M. D., of Weatherford, in the county of Parker and State of Texas.

My invention has for its object to furnish an improved medical compound, called by me "Liver Invigorator and Cholagogue," which shall be very effective as a corrective of biliousness, stagnant bowels, indigestion, &c., caused by miasmatic influences, torpor of the liver, headache arising from disordered stomach, bowels, and liver, produced by malarious poisons, and other miasmatic and malarious diseases and disorders; for inaction of the liver and bowels; for habitual constipation of the prima viæ; for all forms of indigestion arising from inert states of the abdominal viscera; and which shall be a purely vegetable preparation; and it consists of the compound prepared of the ingredients in the proportions and manner hereinafter set forth.

In preparing this compound I use the following recipe and formula: R. septanudræ verginicæ, pulverized, one ounce, apothecary's weight; cassiæ acuti foliæ, pulverized, five ounces; aristolochiæ serpentariæ, pulverized, two ounces; panacis quinquefolii, pulverized, one ounce; aquæ bulliente, f. M. ss.

Infuse, macerate, agitate for twelve hours, keeping the vat or vessel closely covered, express, and filter. To each quantity of the infusion thus prepared add spiriti vini rectificat, one pint. Bottle and carefully cork.

Having thus described my invention, I claim as new and desire to secure by Letters Patent—

An improved medical compound, prepared of the ingredients, in the proportions, and manner substantially as herein set forth.

WILLIAM L. SIMMONS.

Witnesses:
W. J. CARSON,
T. D. LEWIS.

(98)